(12) United States Patent
Kasami et al.

(10) Patent No.: US 6,373,814 B2
(45) Date of Patent: Apr. 16, 2002

(54) METHOD OF INITIALIZING PHASE-CHANGE OPTICAL DISK TO PREVENT JITTER INCREASE DUE TO LOW LEVEL OVERWRITING

(75) Inventors: Yutaka Kasami, Kanagawa; Kazumine Ito, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/004,735

(22) Filed: Jan. 9, 1998

(30) Foreign Application Priority Data

Jan. 10, 1997 (JP) .............................. 9-003371

(51) Int. Cl.[7] .................................. G11B 7/24
(52) U.S. Cl. .................. 369/275.2; 428/64.1
(58) Field of Search ................... 369/275.2, 275.3, 369/275.1, 275.4, 532, 44.26, 283, 276–279, 13; 428/64.1, 64.4, 64.6, 65.3, 64.3, 65.6, 694 ML, 694 R; 430/320

(56) References Cited

U.S. PATENT DOCUMENTS

| | | | | |
|---|---|---|---|---|
| 5,477,524 A | * | 12/1995 | Deguchi et al. | ......... 369/275.1 |
| 5,477,527 A | * | 12/1995 | Tsuchiya et al. | ......... 369/275.4 |
| 5,493,561 A | * | 2/1996 | Nishiuchi et al. | ........ 369/275.1 |
| 5,581,539 A | * | 12/1996 | Horie et al. | ............. 369/275.4 |
| 5,648,134 A | * | 7/1997 | Shiratori et al. | ............. 428/641 |
| 5,696,756 A | * | 12/1997 | Fujimoto et al. | ........ 369/275.4 |
| 5,776,574 A | * | 7/1998 | Honguh et al. | ............. 428/64.1 |
| 6,146,740 A | * | 11/2000 | Birukawa et al. | ........... 428/141 |

* cited by examiner

Primary Examiner—Ali Neyzari
(74) Attorney, Agent, or Firm—Sonnenschein, Nath & Rosenthal

(57) ABSTRACT

A method of initializing a phase-change optical disk which is capable of preventing enlargement of an amount of jitter which takes place when the number of overwriting operations does not exceed several times. The surface of the phase-change optical disk, on which information signals will be recorded, is crystallized. Then, signals are recorded with marks and spaces in grooves along tracks of the phase-change optical disk so that initialization is performed. The initialization is performed in such a manner that the length of each of spaces is shorter than a shortest length of spaces of information signals.

5 Claims, 8 Drawing Sheets

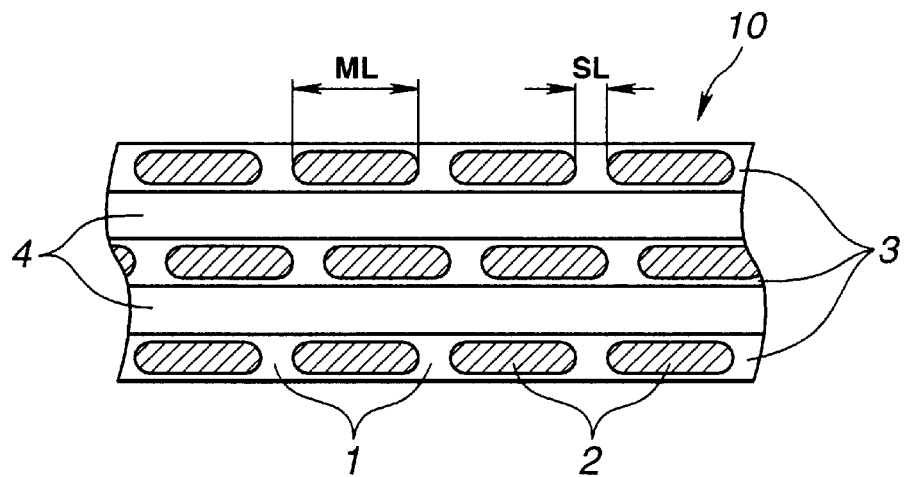
FIG.6
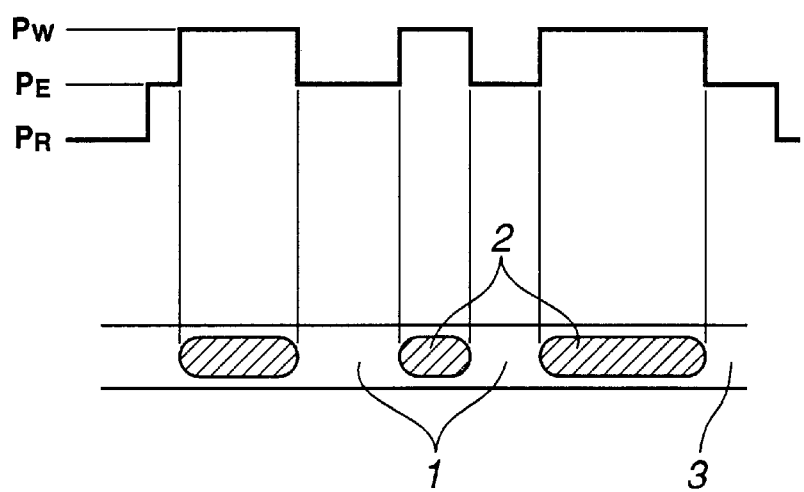
FIG.7A
FIG.7B

METHOD OF INITIALIZING PHASE-CHANGE OPTICAL DISK TO PREVENT JITTER INCREASE DUE TO LOW LEVEL OVERWRITING

BACKGROUND OF THE INVENTION

Field of the Invention

The present invention relates to a method of initializing a phase-change optical disk which permits an information signal to be recorded/reproduced when irradiated with a laser beam and to a phase-change optical disk adaptable to the initializing method.

A phase-change optical disk of a type which permits an information signal to be recorded/reproduced when irradiated with a laser beam has been suggested.

As shown in FIG. 1, a phase-change optical disk 10 of the foregoing type has the main surface of a transparent substrate 11 made of a plastic, such as polycarbonate. On the main surface of the transparent substrate 11, there are formed multi-layered films 12 to 16 which are functional films including a first dielectric layer 12, a phase-change material layer 13, a second dielectric layer 14, a reflecting layer 15 and a protective film 16. The multi-layered films 12 to 16 are formed by application processes.

As shown in FIG. 2, the phase-change optical disk 10 uses the multi-layered films 12 to 16 as surfaces on which information signals are recorded. The difference between the reflectance of crystal of the phase-change material and that of amorphous phases is used to record/reproduce the information signal. That is, amorphous marks 2 and crystal spaces 1 are formed along tracks formed on the surface on which an information signal will be recorded. Thus, an information signal can be recorded, and the recorded information signal can be read.

The phase-change optical disk 10 is different from a magneto-optical disk in that no external magnetic field need be applied to the phase-change optical disk 10 when an information signal is recorded or reproduced. Therefore, magnetic heads and the like are not required to record or reproduce an information signal. Thus, considerable research of the phase-change optical disk has been done because of great expectations for a next-generation information recording medium.

The phase-change optical disk 10 having the above-mentioned structure has a surface, on which an information signal will be recorded that, must be initialized before a user uses the phase-change optical disk 10.

The multi-layered films 12 to 16 forming the surface of the phase-change optical disk 10, on which an information signal will be recorded, are usually formed by application processes, for example, sputtering. Therefore, the surface of the phase-change optical disk 10 having the multi-layered films 12 to 16, on which information signals will be recorded, must temporarily be crystallized by an appropriate method.

FIG. 3 shows a portion of the surface of the phase-change optical disk 10, on which information signals will be recorded and which has fully crystallized by an initializing process. The surface, on which information signals will be recorded, has grooves 3 and lands 4 both of which have been crystallized so that spaces 1 are created.

As shown in FIG. 4, a portion of the phase-change optical disks 10 having the surface, on which information signal will be recorded and the overall surface of which has been crystallized, has regular information signals in order to inspect the signal characteristic of the surface on which information signal will be recorded. As an alternative to this, another portion of the phase-change optical disks 10 has irregular information signals, as shown in FIG. 5.

Since the information signal arranged to be recorded on the phase-change optical disk 10 conforms to a so-called EFM-modulation format, the length ML of each mark and the length SL of each space fall within a range from 3T to 11T when T indicates a unit period.

The phase-change optical disk 10, which has been initialized by crystallization of the overall surface on which information signal will be recorded or by recording appropriate information signals on the surface on which information signal will be recorded, suffers from a problem in that the amount of jitter increases until overwriting is performed about ten times.

Enlargement of the amount of jitter is generally detrimental to the accuracy of the information signal and to the stability of the apparatus. It is ideal that the amount of jitter is not higher than 10%.

OBJECT AND SUMMARY OF THE INVENTION

In view of the foregoing, an object of the present invention is to provide a method of initializing a phase-change optical disk which is capable of preventing an increases in the amount of jitter which takes place when the number of overwriting operations does not exceed about ten times, and to provide a phase-change optical disk.

To achieve the above-mentioned object, according to one aspect of the present invention, there is provided a method of initializing a phase-change optical disk comprising: a crystallizing step for crystallizing recording regions formed on the main surface of a disk; and a recording step for recording at least marks along tracks by irradiating the recording regions with laser beams, wherein the length of each of spaces formed between the marks along the tracks is shorter than a shortest length of spaces each of which is formed between information signals which will be recorded on the recording regions.

The above-mentioned method of initializing a phase-change optical disk has the crystallizing step in which the recording regions formed on the main surface of the disk are crystallized. In the recording step, marks are recorded in the recording regions along the tracks by performing irradiation with laser beams. When the initialization is performed, the length of each of the spaces formed between the marks is made to be shorter than a shortest length of spaces formed between information signals. It is preferable that the space between the marks be shorter than the shortest recording wavelength or that no space is formed.

The method of initializing a phase-change optical disk according to the present invention is arranged in such a manner that the recording step uses irradiation with pulse signals.

The method of initializing a phase-change optical disk according to the present invention has a structure that the recording step is performed in such a manner that continuous molten amorphous regions are formed along the tracks of the recording regions by performing irradiation with DC light beams.

According to another aspect of the present invention, there is provided a phase-change optical disk comprising: a disk having a main surface on which recording regions are formed; and at least marks formed in the recording regions along tracks, wherein the length of each of spaces formed between the marks along the tracks is shorter than a shortest length of spaces formed between information signals which will be recorded on the recording regions.

The phase-change optical disk is arranged in such a manner that the marks having spaces which are shorter than the shortest space between information signals are formed along tracks in the recording regions formed on the main surface of the disk.

The phase-change optical disk according to the present invention has a structure that the marks are continuously recorded on the recording regions.

The phase-change optical disk according to the present invention has a structure that the marks are continuously recorded along the tracks in the recording regions formed on the main surface of the disk.

Other and further objects, features and advantage of the invention will be appear more fully from the following description.

BRIEF DESCRIPTION OF THE DRAWINGS

FIG. 6 is a plan view schematically showing the surface of the phase-change optical disk on which information signals will be recorded and which has been initialized by a method according to a first embodiment of the present invention;

FIG. 7 is a graph schematically showing the relationship among recording power $P_W$, bias power $P_E$, reproducing power $P_R$, marks and spaces on the tracks of the phase-change optical disk;

DETAILED DESCRIPTION OF THE INVENTION

First and second embodiments of a method of initializing a phase-change optical disk and a phase-change optical disk according to the present invention will now be described with reference to the drawings.

FIRST EMBODIMENT

A phase-change optical disk 10 has been initialized by an initializing method according to this embodiment. As shown in FIG. 6, signals each having space length SL which is shorter than the shortest space length of an information signal, are, as marks 2, recorded on grooves 3 along the track of the surface on which information signals will be recorded. It is preferable that the space is shorter than the shortest space of the information signal or that no space is provided.

Figure 1:
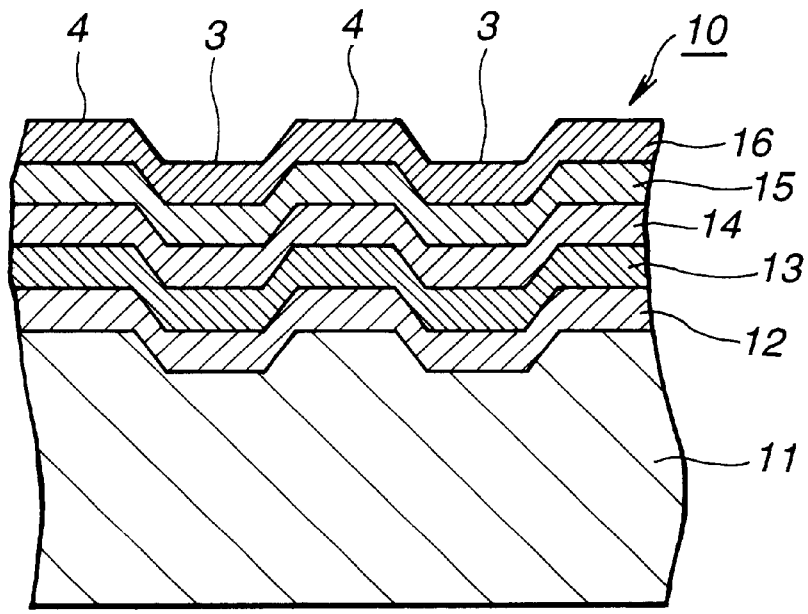
FIG. 1 is a cross sectional view showing a phase-change optical disk.
Figure 2:
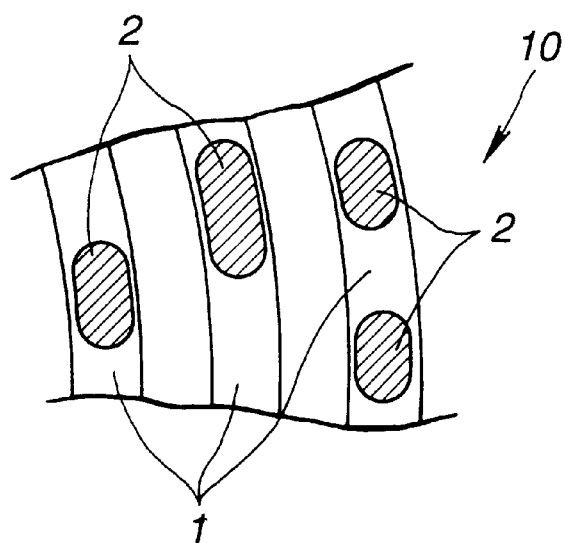
FIG. 2 is a plan view schematically showing a portion of a surface of a phase-change optical disk on which information signals will be recorded.
Figure 3:
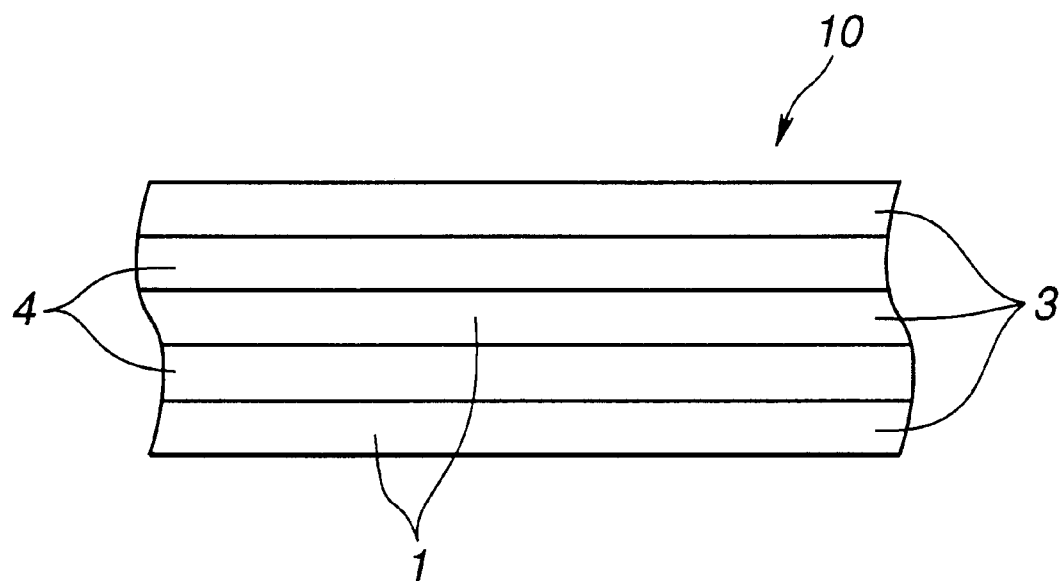
FIG. 3 is a plan view schematically showing a portion of a surface of the phase-change optical disk on which information signals will be recorded and which has been completely crystallized.
Figure 4:
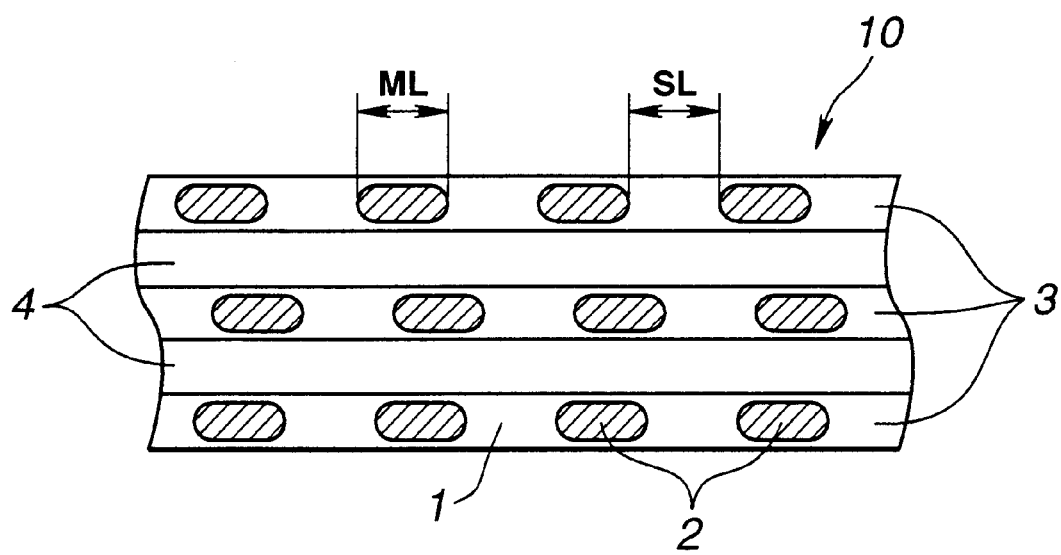
FIG. 4 is a plan view schematically showing a portion of the surface of the phase-change optical disk on which information signals will be recorded and which has been initialized by a method; not in accordance with the present invention
Figure 5:
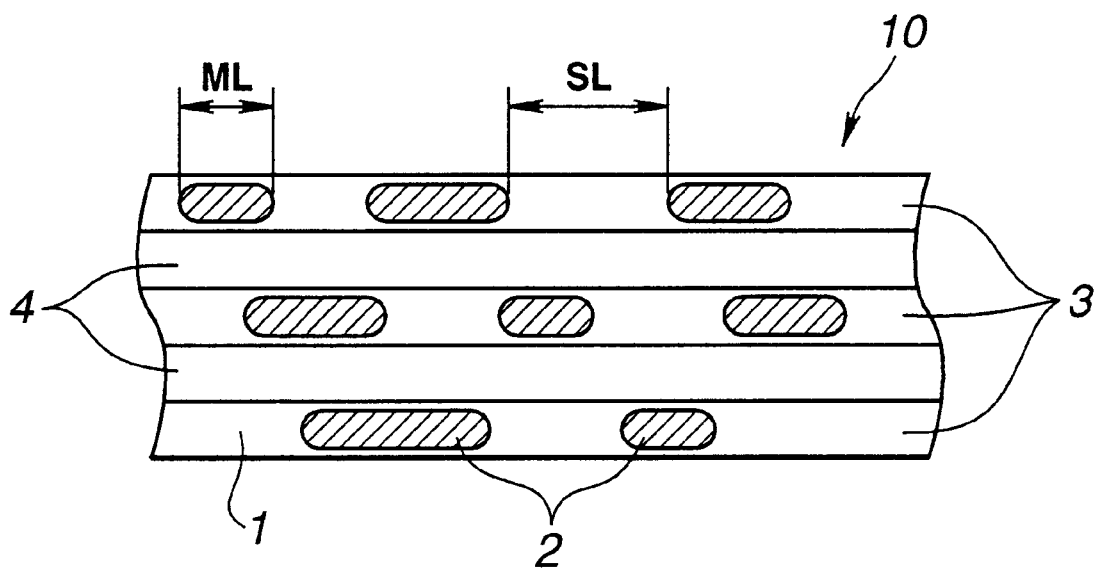
FIG. 5 is a plan view schematically showing the surface of the phase-change optical disk on which information signals will be recorded and which has been initialized by another method; not in accordance with the present invention.

As shown in FIG. 1, the phase-change optical disk 10 according to this embodiment has a transparent substrate 11 formed into a disc-like shape and made of polycarbonate or the like by an injection molding method. Multi-layered films 12 to 16, which are functional layers, are formed on the transparent substrate 11 by application processes. Moreover, tracks composed of grooves 3 and lands 4 are formed on the main surface of the transparent substrate 11 in such a manner that the pitch between tracks is 1.4 $\mu$m and the depth of each groove 3 is 72 nm.

The multi-layered films 12 to 16 are formed by sequentially applying a first dielectric layer 12, a phase-change material layer 13, a second dielectric layer 14, a reflecting layer 15 and a protective film 16. The multi-layered films 12 to 16 formed by the application processes have the following functions so that the surface of the multi-layered films 12 to 16 serves as the surface on which information signals will be recorded.

The phase-change material layer 13 is made of a material of a type containing crystal and amorphous phases having different optical characteristics and permitting change of the foregoing phases when irradiated with a laser beam from outside. When the phase-change material layer 13 is irradiated with a controlled laser beam, the marks 2 in the form of the amorphous phase and spaces 1 in the form of crystal are alternately or continuously formed on either of the grooves 3 or the lands 4 forming the tracks. Since the reflectance of the amorphous material is lower than that of crystal, the difference between the marks 2 and the spaces 1 can be detected by examining the reflectance in such a manner that they are irradiated with a laser beam applied from outside.

The first dielectric layer 12, the second dielectric layer 14 and the reflecting layer 15 determine the optical characteristic of the phase-change optical disk 10 including the reflectance. The second dielectric layer 14 and the reflecting layer 15 determine the thermal characteristic of the phase-change optical disk 10. The protective film 16 protects the layers formed on the main surface of the phase-change optical disk 10.

As shown in FIG. 7, recording, deletion and reproduction of an information signal to and from the phase-change optical disk 10 are permitted when the power of the laser beam with which the surface on which information signals will be recorded is irradiated is selected among high, intermediate and low power levels.

Recording power $P_W$ for recording an information signal on the surface on which information signals will be recorded heats the phase-change material layer 13 to a temperature not lower than the melting point of the phase-change material layer 13. Thus, the portion of the phase-change material layer 13 is melted. Then, the foregoing portion of the phase-change material layer 13 is rapidly cooled so that the portion is formed into the amorphous state.

Bias power $P_E$ for deleting an information signal heats the phase-change material layer 13 to a temperature not lower than the crystallizing temperature and lower than the melting point. When the phase-change material layer 13 is irradiated with the luminous flux having the bias power $P_E$, the amorphous portion is crystallized.

Since reproducing power $P_R$ is used to read the information signal, great power is not required.

When laser beams as shown in FIG. 7A and having the recording power $P_W$, the bias power $P_E$ and the reproducing power $P_R$ switched arbitrarily are applied to the surface on which information signals will be recorded, portions corresponding to the recording power $P_W$ and bias power $P_E$ are formed into the marks 2 and the spaces 1, as shown in FIG. 7B.

The multi-layered films 12 to 16 are formed by the following sequential process.

Initially, a mixture of ZnS and $SiO_2$ (hereinafter called as "ZnS—$SiO_2$") is applied to the main surface of the transparent substrate 11 by sputtering so that a layer having a thickness of 110 nm is formed. The thus-formed layer serves as the first dielectric layer 12.

Then, a mixture having a composition as Ge:21, Sb:25 and Te:54 is applied to the first dielectric layer 12 by sputtering so that a layer having a thickness of 24 nm is formed. The thus-formed layer serves as the phase-change material layer 13.

Then, the foregoing ZnS—$SiO_2$ is applied to the phase-change material layer 13 by sputtering so that a layer having a thickness of 18 nm is formed. The thus-formed layer serves as the second dielectric layer 14.

Then, Al alloys are applied to the second dielectric layer 14 by sputtering so that a layer having a thickness of 150 nm is formed. The thus-formed layer serves as the reflecting layer 15.

Then, ultraviolet-curing resins (UV) are applied to the reflecting layer 15 by spin coating, and then cured with applied ultraviolet rays. Thus, a layer having a thickness of 6 nm is formed. The thus-formed layer serves as the protective film 16.

As a result of the above-mentioned processes, the multi-layered films 12 to 16 forming the surface on which information signals will be recorded are formed on the main surface of the phase-change optical disk 10.

Then, the phase-change optical disk 10 is initialized.

That is, the surface of the phase-change optical disk 10, on which information signals will be recorded and which has been formed attributable to the above-mentioned processes, is crystallized by using a commercial initializing unit. As a result of the above-mentioned initializing process, the surface of the phase-change optical disk 10, on which information signals will be recorded, is formed into the spaces 1.

Then, a next initializing process following the foregoing crystallizing process is performed. In this process, signals each having a space length shorter than the space length of information signals which are recorded by a user, that is, marks 2 each having a space length of 3T or shorter are recorded on the surface on which information signals will be recorded.

In this process, signals each having a single frequency are used as the foregoing signals. The duty ratio of the foregoing signal, that is, the ratio of the length of the mark and that of the space in one period of the signal, is made to be a constant value. The thus-arranged signal is recorded only one time. The foregoing signals are recorded in the grooves 3 as marks 2 at a linear speed of 4.8 m/s.

As described above, the method of initializing the phase-change optical disk 10 is composed of two steps which are the process for crystallizing the surface on which information signals will be recorded and the process for recording signals on the surface on which information signals will be recorded.

The optical characteristic of the phase-change optical disk 10 initialized by the above-mentioned processes is evaluated. The evaluation is performed by measuring the DC level of the reproduced beam, the level being called a pull in level. The pull in level corresponds to the reflectance of the surface on which information signals will be recorded.

Figure 8:
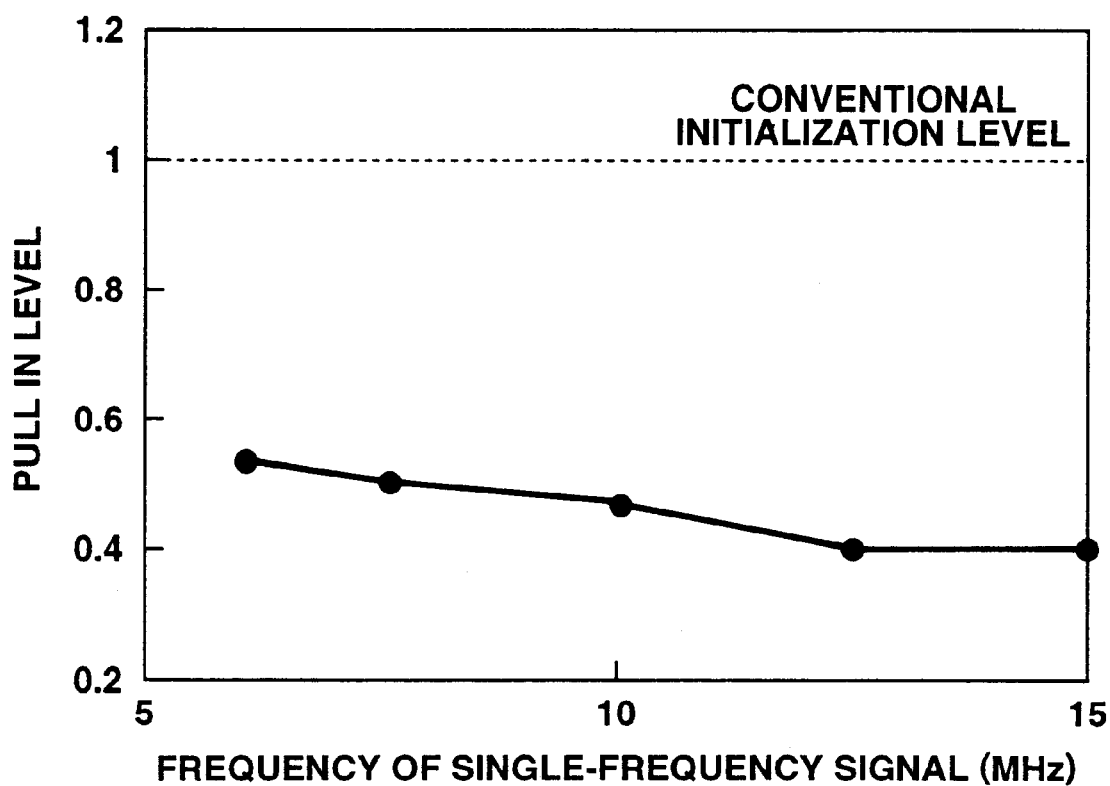
FIG. 8 is a graph showing pull in levels of the phase-change optical disk initialized by the method according to the first embodiment.

As shown in FIG. 8, the pull in level of the phase-change optical disk 10 initialized by the above-mentioned method is considerably reduced to about 0.5 or lower assuming that the conventional initialization level is 1. The reduction in the pull in level is caused from a fact that the foregoing process for recording the signals in the initialization process has been performed in such a manner that the marks 2 are, with the amorphous materials each having a low reflectance, recorded in the grooves 3 in the surface on which information signals will be recorded.

In inverse proportion to the frequency of the single-frequency signals which are recorded in the foregoing process for recording the signals, the pull in level is reduced. The foregoing phenomenon is caused from enlargement of the areas of the marks 2 on the surface on which information signals will be recorded as the frequency is raised.

Since rise in the frequency of the single-frequency signal having the constant duty ratio causes the length of each mark to be shortened, larger areas are marked by the recording power $P_W$ attributable to some reasons.

The above-mentioned phenomena have been confirmed by microscopic observations using a TEM (Transmission Electron Microscope).

Then, the overwriting characteristic of the phase-change optical disk 10 initialized as described above is evaluated. The evaluation is performed by recording and reproducing, to and from the grooves 3 in the surface on which information signals will be recorded, random data signals adapted to the modulation method, which is EFM-plus and having a bit length of 0.4 μm/bit at a linear speed of 4.8 m/s. In the evaluation, the recording power $P_W$ is 8.5 mW, the bias power $P_E$ is 3.5 mW and the reproducing power $P_R$ is 0.8 mW.

Figure 9:
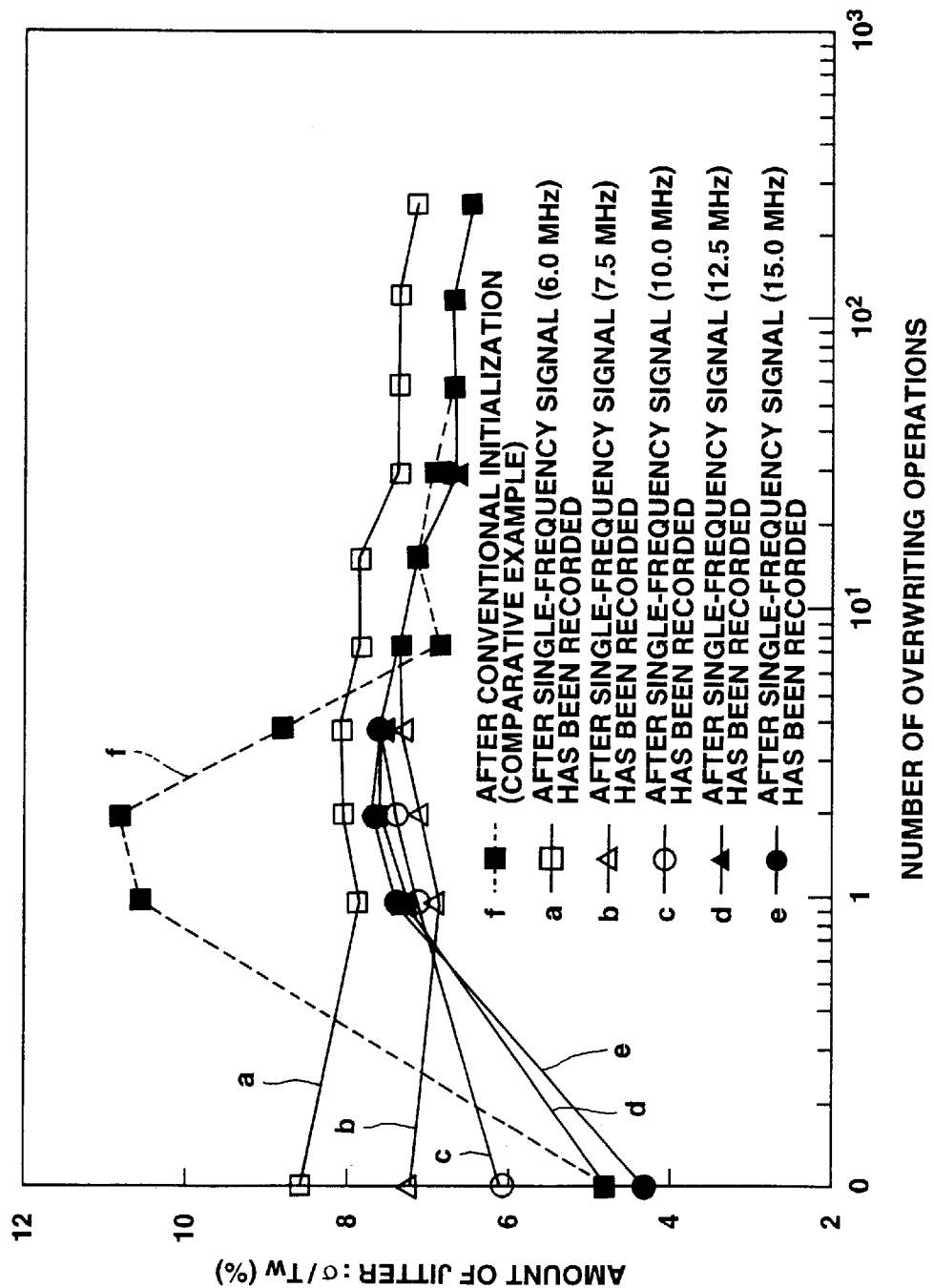
FIG. 9 is a graph showing the overwriting characteristic of the phase-change optical disk initialized by the method according to the first embodiment.

Results of measurement of the overwriting characteristic of the phase-change optical disk 10 are shown in FIG. 9. Note that the amounts $\sigma/T_W$ of jitter shown on the axis of ordinate of the graph are values obtained by standardizing the standard deviation $\sigma$ of the jitter with the width $T_W$ of the window.

Results of the measurement of the overwriting characteristic are indicated by polygonal lines in the form of solid lines in the graph shown in FIG. 9. The frequency of the single-frequency signal employed in the process for recording the signals in the process for initializing the phase-change optical disk 10 is 6.0 MHZ for polygonal line a, 7.5 MHZ for polygonal line b, 10.0 MHZ for polygonal line c, 12.5 MHZ for polygonal line d and 15.0 MHZ for polygonal line e.

Moreover, the graph as well as shows the overwriting characteristic of the phase-change optical disk 10 initialized by the conventional method with polygonal line f in the form of a dashed line. Note that the phase-change optical disk 10 initialized by the conventional method is a disk manufactured by the magnetic process according to the first embodiment and having the surface on which information signals will be recorded and which has been crystallized by the commercial initializing apparatus.

The above-mentioned conventional initializing method encounters enlargement of the amount of jitter until the number of the overwriting operations reaches several times. The amount of jitter is considerably enlarged after the first overwriting operation has been performed. Then, the amount of jitter reaches a peak value after the overwriting operations have been performed two times, and then reduced from the peak value until the overwriting operations are performed about ten times. After the number of times of the overwriting operations has exceeded about ten times, the amount of jitter is not changed considerably.

On the other hand, the phase-change optical disk 10 initialized by the method according to this embodiment is free from considerable change in the amount of jitter after the overwriting operations have been performed one or more times. The absolute value of the amount of jitter observed after the overwriting operations have been performed one or more times is constant regardless of the frequency of the single-frequency signal employed in the process for recording the signals.

Dispersion in the amount of jitter occurring when no overwriting operation has been performed is caused from a fact that amount of jitter depends upon the frequency of the single-frequency signal.

As described above, the phase-change optical disk 10 initialized by the initializing method according to the first embodiment does not encounter the enlargement of the amount of jitter experienced with the conventional initializing method until the number of the overwriting operations reaches several times.

Although the commercial initializing apparatus is used to crystallize the surface of the phase-change optical disk 10 according to the first embodiment on which information signals will be recorded, another crystallizing method using flash lamp or the like may be employed.

Although the single-frequency signal having a constant duty ratio is employed as the signals for use in the process for recording the signals, an arbitrary signal may be employed if the employed signal satisfies the condition that the length of the space to be recorded on the surface on which information signals will be recorded is not longer than the shortest space for the information signals. Also the recording conditions including the power of the luminous flux may be changed if the above-mentioned conditions are satisfied.

Although the grooves 3 on the surface on which information signals will be recorded are used in the process of recording the signals and the evaluation of the characteristic by recording/reproducing random data are performed, similar results can be obtained if the lands 4 are employed in the above-mentioned operations.

Although the signals are, in the process for recording the signals, recorded only one time after the surface on which information signals will be recorded has been crystallized, the signals may be recorded two or more times.

After the initialization has been performed by the method according to the first embodiment, the durability of the phase-change optical disk did not deteriorated as compared with the durability after the initialization has been performed by the conventional method.

SECOND EMBODIMENT

Figure 10:
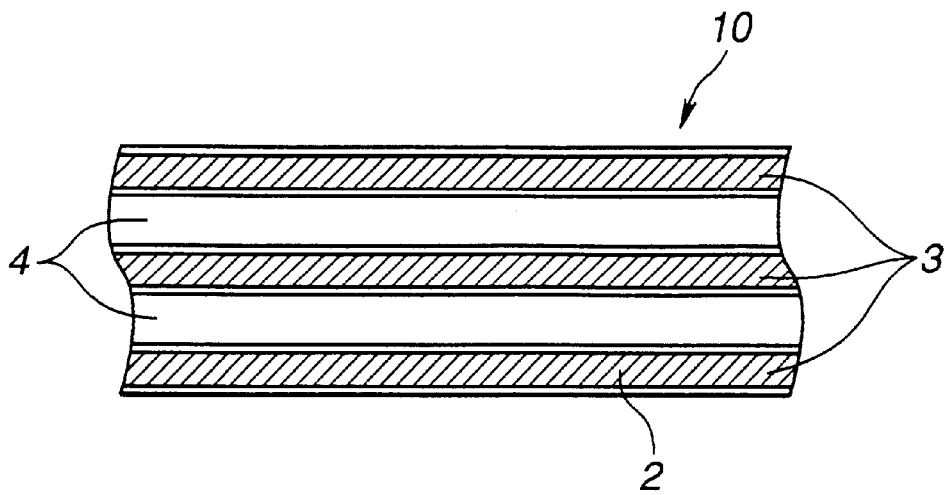
FIG. 10 is a plan view schematically showing the surface of the phase-change optical disk on which information signals will be recorded and which has been initialized by a method according to a second embodiment of the present invention.

A method of initializing the phase-change optical disk 10 according to this embodiment is arranged in such a manner that molten amorphous state is successively formed in the grooves 3 along the tracks on the surface on which information signals will be recorded, as shown in FIG. 10.

In this embodiment, the phase-change optical disk 10 manufactured by the manufacturing method according to the first embodiment is employed. Then, the phase-change optical disk 10 is initialized by the following process.

Initially, the surface of the phase-change optical disk 10, on which information signals will be recorded, is crystallized by using a commercial initializing unit. As a result of the above-mentioned initializing process, the surface of the phase-change optical disk 10, on which information signals will be recorded, is formed into the spaces 1.

Then, a next initializing process following the foregoing crystallizing process is performed. In this process, the surface on which information signals will be recorded is irradiated with DC laser beams (direct-current laser beams) in such a manner that continuous marks 2 of the information signals are recorded on the surface on which information signals will be recorded.

As described above, the method of initializing the phase-change optical disk 10 is composed of two steps which are the process for crystallizing the surface on which information signals will be recorded and the process for recording signals.

The optical characteristic of the phase-change optical disk 10 initialized by the above-mentioned processes is evaluated. The evaluation is performed by measuring the DC level of the reproduced beam, the level being called a pull in level. The pull in level corresponds to the reflectance of the surface on which information signals will be recorded.

Figure 11:
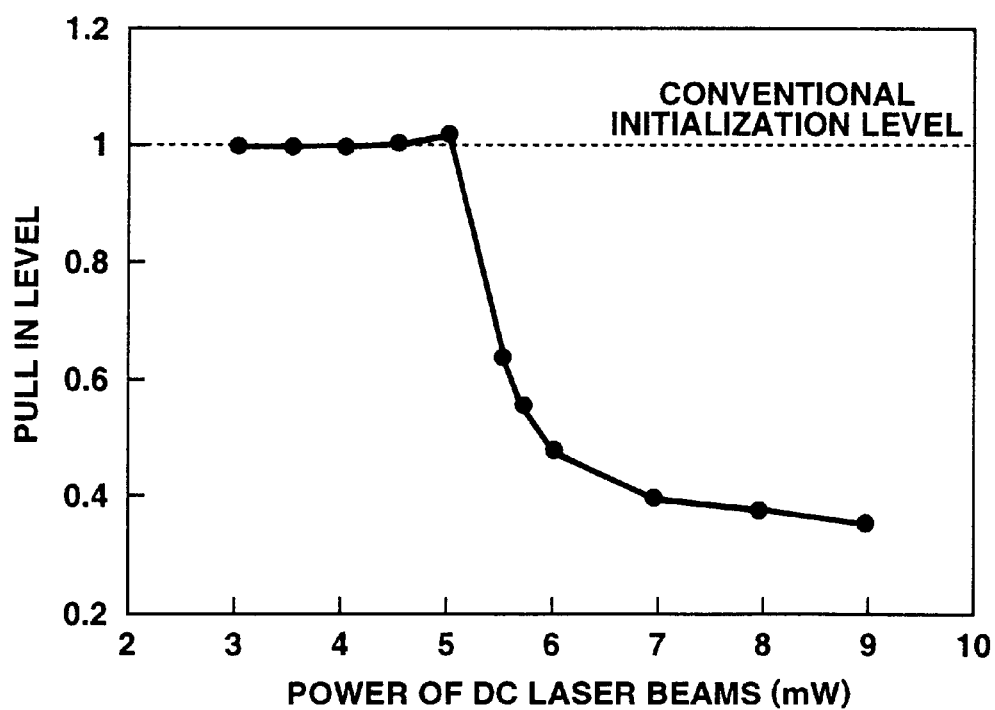
FIG. 11 is a graph schematically showing pull in levels of the phase-change optical disk initialized by the method according to the second embodiment.

An assumption is made that the pull in level of the phase-change optical disk 10 initialized by the conventional method is 1. The pull in level of the phase-change optical disk 10 initialized by the above-mentioned initializing method is close to 1 when DC light beams (the direct-current laser beams) having power smaller than a threshold value is applied when power of the DC laser beams of about 5 mW is made to be the threshold value, as shown in FIG. 11. If the power is larger than the threshold value, the pull in level is reduced to be considerably smaller than 1.

The reduction in the pull in level is caused from a fact that the phase-change material layer 13 on the surface of the phase-change optical disk 10 on which information signals will be recorded is melted if the power of the DC laser beams exceeds the threshold value and thus the amorphous materials having a low reflectance are continuously formed along the tracks. The reason why the pull in level is further reduced in inverse proportion to the power of the DC laser beams lies in that the molten amorphous regions are enlarged because the width of the molten amorphous region is enlarged in proportion to the enlargement of the power of the DC laser beams.

The above-mentioned phenomena have been confirmed by microscopic observations using a TEM (Transmission Electron Microscope).

Then, the overwriting characteristic of the phase-change optical disk 10 initialized as described above is evaluated. The evaluation is performed by recording and reproducing, to and from the grooves 3 in the surface on which information signals will be recorded, random data signals adapted to the modulation method, which is EFM-puls and having a bit length of 0.4 µm/bit at a linear speed of 4.8 m/s. In the evaluation, the recording power $P_W$ is 8.5 mW, the bias power $P_E$ is 3.5 mW and the reproducing power $P_R$ is 0.8 mW.

Figure 12:
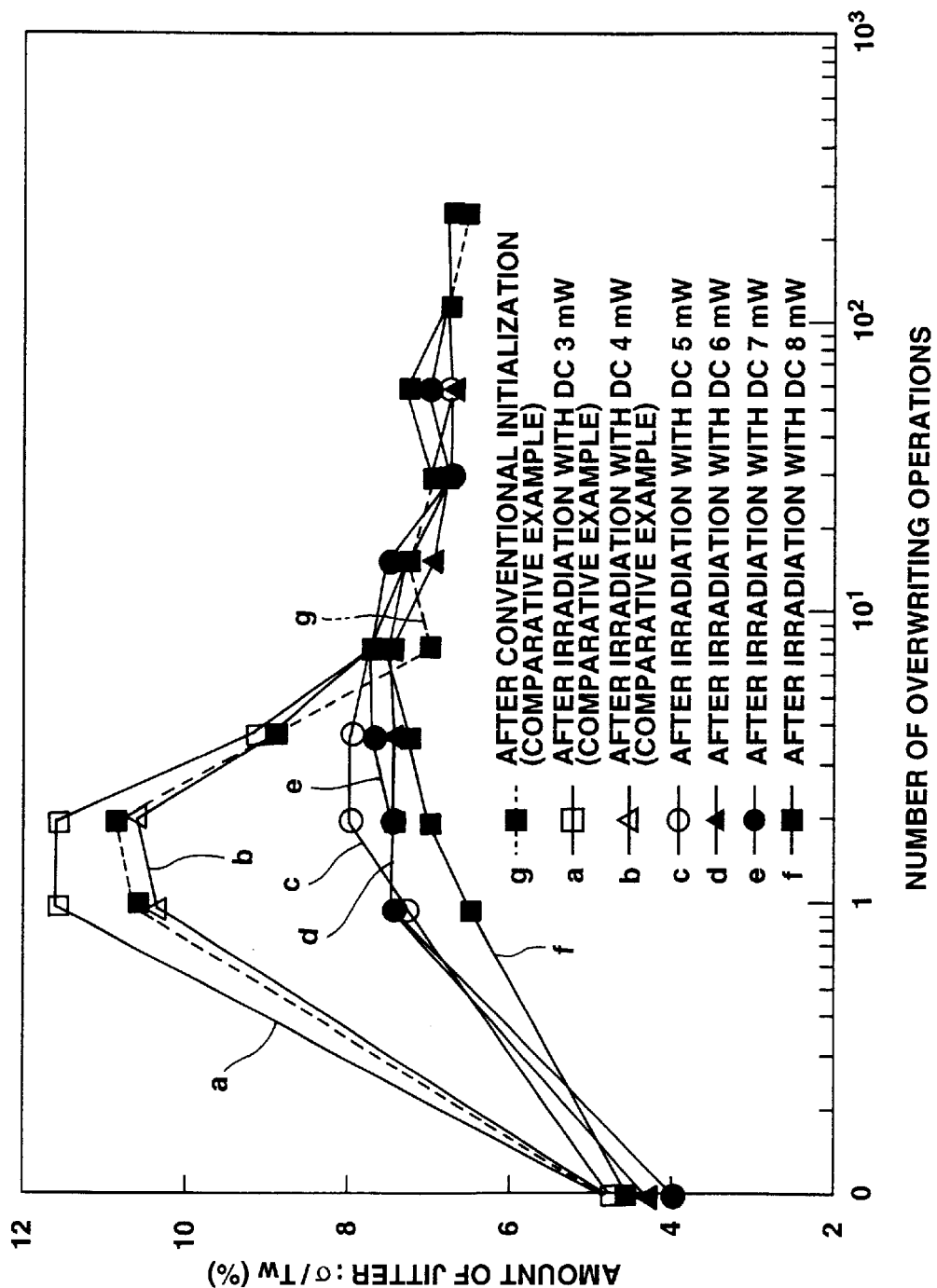
FIG. 12 is a graph showing the overwriting characteristic of the phase-change optical disk initialized by the method according to the second embodiment.

Results of measurement of the overwriting characteristic of the phase-change optical disk 10 are shown in FIG. 12. Note that the amounts $\sigma/T_W$ of jitter shown on the axis of ordinate of the graph are values obtained by standardizing the standard deviation $\sigma$ of the jitter with the width $T_W$ of the window.

Results of the measurement of the overwriting characteristic are indicated by dots connected by solid lines. Power of the DC laser beams in the process for recording signals in the process for initializing the phase-change optical disk 10 is 3 mW for polygonal line a, 4 mW for polygonal line b, 5 mW for polygonal line c, 6 mW for polygonal line d, 7 mW for polygonal line e and 8 mW for polygonal line f.

Note that the polygonal line a corresponding to the power of 3 mW and the polygonal line b corresponding to the power of 4 mW are shown for comparisons. As described above, the molten amorphous state is not realized with the above-mentioned power.

Moreover, the graph as well as shows the comparative overwriting characteristic of the phase-change optical disk 10 initialized by the conventional method with polygonal line g. Note that the phase-change optical disk 10 initialized by the conventional method is a disk manufactured by the magnetic process according to the first embodiment and having the surface on which information signals will be recorded and which has been crystallized by the commercial initializing apparatus.

The above-mentioned conventional initializing method encounters enlargement of the amount of jitter until the number of the overwriting operations reaches several times. The amount of jitter is considerably enlarged after the first overwriting operation has been performed. Then, the amount of jitter reaches a peak value after the overwriting operations have been performed two times, and then reduced from the peak value until the overwriting operations are performed about ten times. After the number of times of the overwriting operations has exceeded about ten times, the amount of jitter is not changed considerably.

When DC laser beams are continuously applied as the process for recording the signals after the crystallizing process has been performed by the method according to the second embodiment, also the polygonal lines a and b encounter considerable enlargement of the amount of jitter until the overwriting operations are performed several times. On the other hand, the polygonal lines c, d, e and f are free from the considerable enlargement of the amount of jitter.

The above-mentioned phenomena occur attributable to the above-mentioned fact that the marks 2 in the molten amorphous state are continuously formed if the power of the DC laser beams exceeds 5 mW. The polygonal lines c, d, e and f initialized because the molten amorphous regions have been formed attributable to power of the DC laser beams exceeding the threshold value are free from the enlargement of the amount of jitter experienced with the conventional initializing method until the number of the overwriting operations exceeds about several times.

Although the commercial initializing apparatus is used to crystallize the surface of the phase-change optical disk 10 according to the second embodiment on which information signals will be recorded, another crystallizing method using flash lamp or the like may be employed.

The conditions under which the continues marks are formed and which includes the linear speed and the power of the laser beams are not limited to the above-mentioned conditions if the molten amorphous states are continuously formed along the tracks.

Although the grooves 3 on the surface on which information signals will be recorded are used in the process of recording the signals and the evaluation of the characteristic by recording/reproducing random data is performed, similar results can be obtained if the lands 4 are employed in the above-mentioned operations.

After the initialization has been performed by the method according to the second embodiment, the durability of the phase-change optical disk did not deteriorated as compared with the durability after the initialization has been performed by the conventional method.

The present invention is not limited to the above-mentioned embodiments. For example, the transparent substrate 11, the first dielectric layer 12, the phase-change material layer 13, the second dielectric layer 14, the reflecting layer 15 and the protective film 16 of the phase-change optical disk 10 may be made of the following materials.

The transparent substrate 11 may be made by an injection molding method using a transparent resin, such as an acrylic resin or a polyolefine resin or the like. As an alternative to this, the transparent substrate 11 may be formed on a glass substrate by a 2P (photo Polymerization) method.

The phase-change material layer (a recording layer) 13 may be made of calcogenite, such as a calcogen compound or sole calcogen. As an alternative to this, a single Te or single Se or a calcogen material selected from the following group may be employed which consists of Ge—Sb—Te, Ge—Te, In—Sb—Te (—Ag), In—Se (—Tl—Co), In—Sb—Se, $Bi_2Te_3$, BiSe, $Sb_2Se_3$ and $Sb_2Te_3$.

The first dielectric layer 12 and the second dielectric layer 14 may be made of nitride, oxide or sulfide of metal or semi metal, such as Al or Si. The foregoing materials are AlN, $Si_3N_4$, $SiO_2$, $Al_2O_3$, ZnS, $MgF_2$ or the like. However, the material must be free from absorption in the wavelength region for a semiconductor laser beam.

The reflecting layer 15 may be composed of a metal element, a semiconductor element, their compound or their mixture, the elements having a heat conductivity of 0.0004 J/(cm.K.s) to 2.2 J/(cm.K.s).

The protective film 16 may be a material which can be employed to form the above-mentioned dielectric layer in place of the ultraviolet-curing resin.

The above-mentioned method of initializing the phase-change optical disk according to the present invention is able to prevent enlargement of the amount of jitter which takes place until the number of the overwriting operations reaches several times. As a result, the accuracy of information signals can be improved when the information signal is recorded or reproduced.

The phase-change optical disk according to the present invention is able to prevent enlargement of the amount of jitter which takes place until the number of the overwriting operations reaches several times. Therefore, the phase-change optical disk is able to improve the accuracy of information signals when the information signal is recorded or reproduced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of initializing a phase-change optical disk comprising the steps of:
   a crystalline step of crystallizing recording regions formed on a main surface of a disk; and
   a recording step of recording reference marks along tracks by irradiating the recording regions with laser beams, wherein
   any space between reference marks formed by said recording step is selected to be less than any space between information marks formed by overwriting said reference marks in accordance with an information signal.

2. A method of initializing a phase-change optical disk according to claim 1, wherein said recording step uses irradiation with pulse signals.

3. A method of initializing a phase-change optical disk according to claim 1, wherein said recording step is performed in such a manner that continuous molten amorphous regions are formed along the tracks of the recording regions by performing irradiation with DC light beams.

4. A phase-change optical disk comprising:
   a disk having a main surface on which recording regions are formed; and
   at least marks formed in the recording regions along tracks, wherein
   the length of each of spaces formed between the marks along the tracks is shorter than a shortest length of spaces each of which is formed between information signals which will be recorded on the recording regions.

5. A phase-change optical disk according to claim 4, wherein the marks are continuously recorded.

* * * * *